US011650691B1

(12) United States Patent
Jung et al.

(10) Patent No.: US 11,650,691 B1
(45) Date of Patent: May 16, 2023

(54) TOUCH DRIVING CIRCUIT AND TOUCH DISPLAY DEVICE

(71) Applicant: LG Display Co., Ltd., Seoul (KR)

(72) Inventors: Sojung Jung, Paju-si (KR); Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/977,752

(22) Filed: Oct. 31, 2022

(30) Foreign Application Priority Data

Nov. 23, 2021 (KR) .......................... 10-2021-0162785

(51) Int. Cl.
 *G06F 3/041* (2006.01)
 *G06F 3/044* (2006.01)
(52) U.S. Cl.
 CPC ...... *G06F 3/04164* (2019.05); *G06F 3/04166* (2019.05); *G06F 3/0446* (2019.05)
(58) Field of Classification Search
 None
 See application file for complete search history.

(56) References Cited

U.S. PATENT DOCUMENTS

| 9,569,035 | B1 | 2/2017 | Lee et al. |
| 2016/0179273 | A1* | 6/2016 | Lee ........................ G06F 3/0412 345/174 |
| 2017/0228084 | A1* | 8/2017 | Kim ...................... G06F 3/0412 |
| 2017/0336909 | A1 | 11/2017 | Song et al. |
| 2018/0004353 | A1 | 1/2018 | Shin |
| 2020/0210022 | A1* | 7/2020 | Kim .................... G06F 3/04166 |

OTHER PUBLICATIONS

Intellectual Property Office of the United Kingdom, Office Action, GB Patent Application No. 2216165.7, dated Mar. 15, 2023, six pages.

* cited by examiner

*Primary Examiner* — Krishna P Neupane
(74) *Attorney, Agent, or Firm* — Fenwick & West LLP

(57) ABSTRACT

A touch driving circuit and a touch display device are disclosed. A plurality of channel switches for driving touch electrodes disposed in areas disposed symmetrically to each other may be simultaneously turned on to perform touch sensing in a state in which a plurality of touch lines electrically connected to the plurality of channel switches are short-circuited to each other. Accordingly, touch sensing may be performed using touch data in which a load deviation due to the touch lines according to areas in which the touch electrodes are disposed is reduced, thereby improving the performance of the touch sensing.

20 Claims, 10 Drawing Sheets

TOUCH DRIVING CIRCUIT AND TOUCH DISPLAY DEVICE

CROSS REFERENCE TO RELATED APPLICATION

This application claims priority from Republic of Korea Patent Application No. 10-2021-0162785, filed on Nov. 23, 2021, which is hereby incorporated by reference in its entirety.

BACKGROUND

1. Field of Technology

Embodiments of the present disclosure relate to a touch driving circuit and a touch display device.

2. Description of the Prior Art

In order to provide different functions to a user, a display device may provide a function of detecting a user's touch on a display panel and processing an input based on the detected touch.

A display device may include, for example, a plurality of touch electrodes disposed in a display panel and a touch driving circuit for driving the plurality of touch electrodes. The touch driving circuit may drive the touch electrode by supplying a touch driving signal to the touch electrode. In a state in which the touch driving signal is applied to the touch electrode, the touch driving circuit may detect a change in capacitance generated by a touch of a user and sense the touch.

SUMMARY

The inventors have realized that the distance between touch electrodes and a touch driving circuit may be different according to positions at which the touch electrodes driven by the touch driving circuit are disposed in a display panel. A load deviation between lines connecting the touch driving circuit and the touch electrodes may occur due to a difference in distance between the touch driving circuit and the touch electrodes.

Due to the load deviation between the lines, a deviation of the touch sensing signal may occur, and the performance of touch sensing can be degraded.

An aspect of the present disclosure is to provide a touch driving circuit and a touch display device capable of reducing a load deviation between touch lines connecting the touch driving circuit and touch electrodes and improving the performance of touch sensing.

In an aspect, embodiments of the present disclosure provide a touch display device including a plurality of touch electrodes in a display panel, a multiplexer including N channel switches, each of the N channel switches electrically connected to a corresponding one of N touch electrodes among the plurality of touch electrodes, wherein N is an integer greater than or equal to 2, and a sensing unit electrically connected to the multiplexer, wherein 2k channel switches among the N channel switches are turned on and short-circuited to each other during at least a partial period of a first sensing period, wherein k is an integer greater than or equal to 1, and at least two of the 2k channel switches are sequentially turned on during a separate period in at least a partial period of a second sensing period that is after the first sensing period.

In another asepect, embodiments of the present disclosure provide a touch display device including a plurality of touch electrodes in a display panel, a multiplexer including N channel switches, each of the N channel switches electrically connected to a corresponding one of N touch electrodes among the plurality of touch electrodes, wherein N is an integer greater than or equal to 2, and a sensing unit electrically connected to the multiplexer, wherein two or more channel switches among the N channel switches are turned on and short-circuited to each other during at least a partial period of a first sensing period, and each of the two or more channel switches is sequentially turned on during a separate period in at least a partial period of a second sensing period that is after the first sensing period.

In still another asepect, embodiments of the present disclosure provide a touch driving circuit including a multiplexer which includes N channel switches, each of the N channel switches electrically connected to a corresponding one of N touch electrodes, wherein N is an integer greater than or equal to 2, and a sensing unit electrically connected to the multiplexer, wherein 2k channel switches among the N channel switches are turned on and short-circuited to each other during at least a partial period of a first sensing period, wherein k is an integer greater than or equal to 1, and at least two of the 2k channel switches are sequentially turned on during a separate period in at least a partial period of a second sensing period that is after the first sensing period.

In one embodiment, a touch display device comprises: a display panel including a plurality of touch electrodes; a multiplexer comprising a plurality of channel switches, each channel switch electrically connected to a corresponding touch electrode from the plurality of touch electrodes; and a sensing circuit electrically connected to the multiplexer, the sensing circuit configured to sense touch of the touch display device during a first sensing period and during a second sensing period that is after the first sensing period, wherein during a first part of the first sensing period, a first channel switch from the plurality of channel switches that is connected to a first touch electrode from the plurality of touch electrodes is on while a second channel switch from the plurality of channel switches that is connected to a second touch electrode from the plurality of touch electrodes is also on such that the first channel switch and the second channel switch are short-circuited to each other during the first part of the first sensing period, and during a first part of the second sensing period the first channel switch is on while the second channel switch is off and during a second part of the second sensing period that is after the first part the second channel switch is on while the first channel switch is off responsive to the sensing circuit sensing that at least one of the first touch electrode and the second touch electrode are touched during the first sensing period.

According to embodiments of the present disclosure, since touch sensing is performed by simultaneously driving 2k touch electrodes symmetrically disposed in a display panel, it is possible to reduce a load deviation between touch lines according to positions at which the touch electrodes are disposed, thereby improving the performance of touch sensing.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
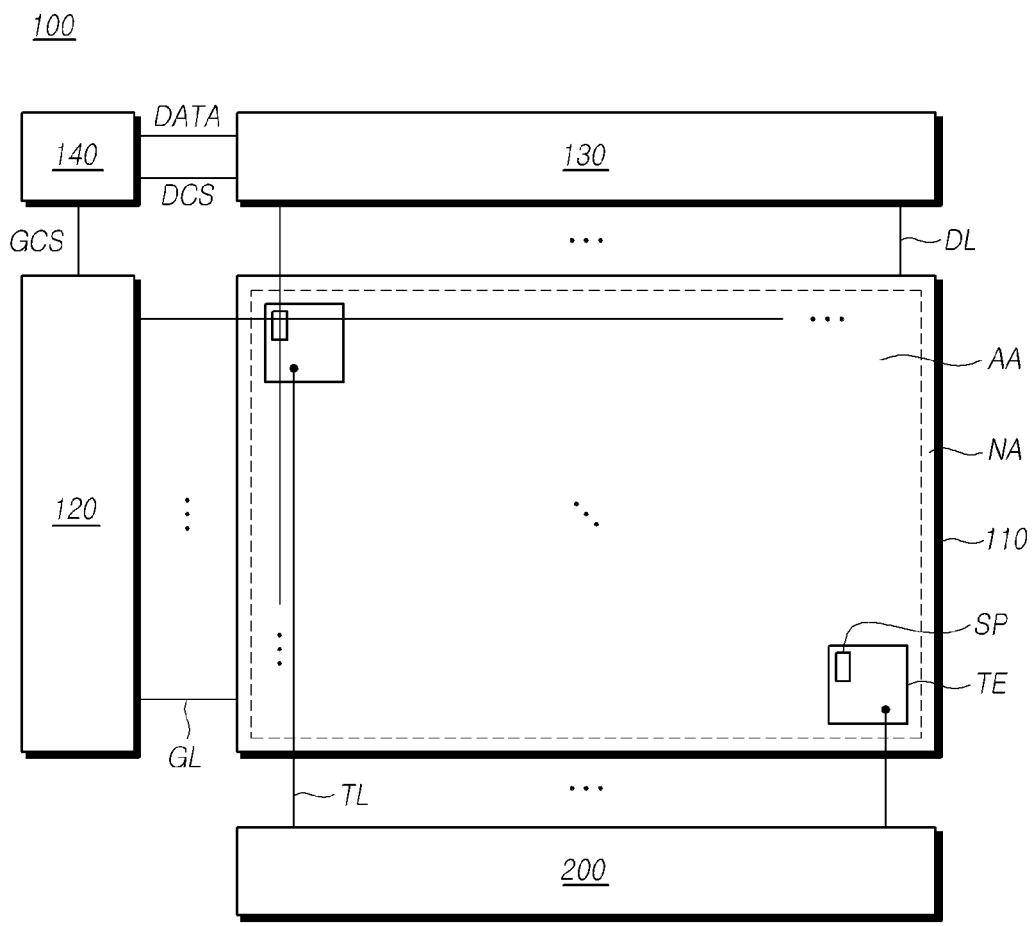
FIG. 1 is a schematic diagram illustrating a configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a schematic diagram illustrating a configuration of a touch display device 100 according to embodiments of the present disclosure.

Referring to FIG. 1, the touch display device 100 may include a display panel 110, and a gate driving circuit 120, a data driving circuit 130, and a controller 140 which are for driving the display panel 110.

The touch display device 100 may include a plurality of touch electrodes TE disposed in the display panel 110 to sense a touch. The touch display device 100 may include a touch sensing system 200 which drives the touch electrode TE and performs touch sensing.

The display panel 110 may include an active area AA in which a plurality of subpixels SP are disposed and a non-active area NA positioned outside the active area AA.

Each of the plurality of touch electrodes TE may be disposed in an area corresponding to two or more subpixels SP.

A plurality of gate lines GL and a plurality of data lines DL may be disposed in the display panel 110, and the subpixel SP may be positioned in an area in which the gate line GL and the data line DL intersect. A plurality of touch lines TL electrically connected to the touch electrodes TE may be disposed in the display panel 110.

When a configuration for display driving in the touch display device 100 is described, the gate driving circuit 120 is controlled by the controller 140 and sequentially outputs scan signals to the plurality of gate lines GL disposed in the display panel 110 to control a driving timing of the plurality of subpixels SP.

The gate driving circuit 120 may include one or more gate driver integrated circuits (GDICs) and may be positioned at only one side or both sides of the display panel 110 according to a driving method.

Each GDIC may be connected to a bonding pad of the display panel 110 in a tape automated bonding (TAB) type or a chip-on-glass (COG) type. Alternatively, each GDIC may be implemented as a gate-in-panel (GIP) type and disposed directly on the display panel 110. Alternatively, each GDIC may be integrated with and disposed on the display panel 110. Alternatively, each GDIC may be implemented as a chip-on-film (COF) type mounted on a film connected to the display panel 110.

The data driving circuit 130 receives image data DATA from the controller 140 and converts the image data into an analog data voltage. The data driving circuit 130 allows each subpixel SP to express brightness according to image data by outputting a data voltage to the data line DL according to a timing at which a scan signal is applied through the gate line GL.

The data driving circuit 130 may include one or more source driver integrated circuits (SDICs).

Each SDIC may include a shift register, a latch circuit, a digital-to-analog converter, an output buffer, and the like.

Each SDIC may be connected to a bonding pad of the display panel 110 in a TAB type or a COG type. Alternatively, each SDIC may be disposed directly on the display panel 110. Alternatively, each SDIC may be integrated with and disposed on the display panel 110. Alternatively, each SDIC may be implemented as a COF type. In this case, each SDIC may be mounted on a film connected to the display panel 110 and may be electrically connected to the display panel 110 through lines on the film.

The controller 140 may supply various control signals to the gate driving circuit 120 and the data driving circuit 130 and may control the operations of the gate driving circuit 120 and the data driving circuit 130.

The controller 140 may be mounted on a printed circuit board, a flexible printed circuit, or the like and may be electrically connected to the gate driving circuit 120 and the data driving circuit 130 through the printed circuit board, the flexible printed circuit, or the like.

The controller 140 allows the gate driving circuit 120 to output a scan signal according to a timing set in each frame. The controller 140 converts image data input from an external device to be suitable for a data signal format used by the data driving circuit 130 and outputs the converted image data to the data driving circuit 130.

The controller 140 receives various timing signals including a vertical synchronization signal VSYNC, a horizontal synchronization signal HSYNC, an input data enable (DE) signal, and a clock signal CLK together with image data from an external device (for example, a host system).

The controller 140 may generate various control signals using the various timing signals received from the external device and may output the the generated various control signals to the gate driving circuit 120 and the data driving circuit 130.

As an example, in order to control the gate driving circuit 120, the controller 140 outputs various gate control signals (GCSs) including gate start pulse (GSP), gate shift clock (GSC), and gate output enable (GOE) signals.

The GSP signal controls an operation start timing of one or more GDICs constituting the gate driving circuit 120. The GSC signal is a clock signal commonly input to one or more GDICs and controls a shift timing of a scan signal. The GOE signal specifies timing information of one or more GDICs.

In addition, in order to control the data driving circuit 130, the controller 140 outputs various data control signals (DCSs) including source start pulse (SSP), source sampling clock (SSC), and source output enable (SOE) signals.

The SSP signal controls a data sampling start timing of one or more SDICs constituting the data driving circuit 130. The SSC signal is a clock signal that controls a sampling timing of data in each SDIC. The SOE signal controls an output timing of the data driving circuit 130.

The touch display device 100 may further include a power management integrated circuit which supplies various voltages or currents to the display panel 110, the gate driving circuit 120, the data driving circuit 130, or the like or controls the various voltages or currents to be supplied.

When a configuration for touch sensing in the touch display device 100 is described, the touch sensing system 200 may drive the plurality of touch electrodes TE disposed in the display panel 110.

The touch sensing system 200 may supply a touch driving signal to the touch electrode TE through the touch line TL and may receive a touch sensing signal from the touch electrode TE to detect the presence or absence of a touch and touch coordinates.

The touch electrode TE may be positioned outside the display panel 110 or inside the display panel 110.

When the touch electrode TE is positioned inside the display panel 110, the touch electrode TE may be an electrode disposed separately from an electrode for display driving. Alternatively, the touch electrode TE may be one of the electrodes for display driving.

For example, the touch electrode TE may be an electrode disposed by dividing a common electrode for display driving.

In this case, the touch electrode TE may perform a function of an electrode for touch sensing and a function of an electrode for display driving.

As an example, the touch electrode TE may be driven as the touch electrode TE and a common electrode in periods that are temporally divided. Alternatively, the touch electrode TE may simultaneously perform a function of the touch electrode TE and a function of the common electrode.

In this case, since a touch driving signal is applied to the touch electrode TE in a display driving period, a signal for display driving (for example, a data voltage or a scan signal) may be supplied in a modulated form based on the touch driving signal.

As described above, the touch sensing system 200 may perform touch sensing by supplying a touch driving signal to the touch electrode TE in a display driving period or a period temporally divided from the display driving period.

Figure 2:
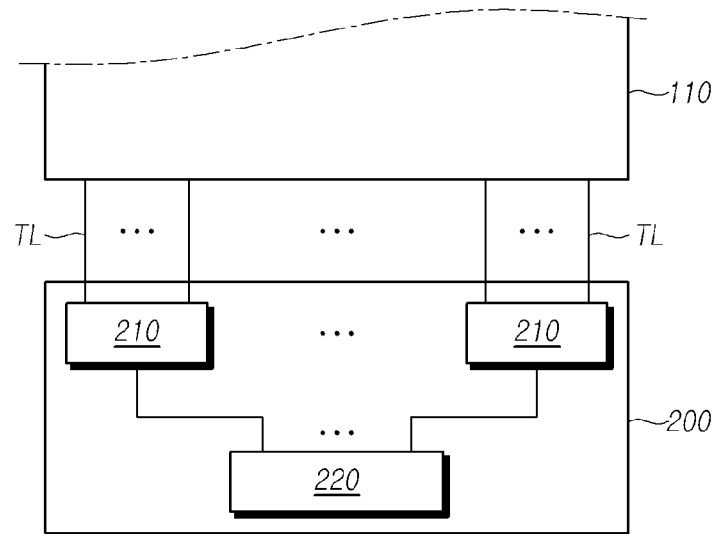
FIG. 2 is a schematic diagram illustrating a configuration of a touch sensing system according to embodiments of the present disclosure.

FIG. 2 is a schematic diagram illustrating a configuration of a touch sensing system 200 according to embodiments of the present disclosure.

Referring to FIG. 2, the touch sensing system 200 may include touch driving circuits 210 and a touch controller 220.

The touch driving circuit 210 may be electrically connected to a plurality of touch lines TL. The touch driving circuit 210 may drive touch electrodes TE disposed in a display panel 110 through the touch lines TL. The touch driving circuit 210 may transmit data based on a touch sensing signal detected from the touch electrode TE to the touch controller 220 through the touch line TL.

The touch sensing system 200 may include two or more touch driving circuits 210 according to a size of the display panel 110.

The touch driving circuit 210 may be disposed on a printed circuit board or a flexible printed circuit. As an example, the touch driving circuit 210 may be mounted on a film and electrically connected to the display panel 110 through the film.

In some cases, the touch driving circuit 210 may be disposed in a form integrated with a data driving circuit 130. Alternatively, the touch driving circuit 210 may be disposed separately from the data driving circuit 130.

The touch controller 220 may control the touch driving circuit 210 to receive data according to a touch sensing result from the touch driving circuit 210.

The touch controller 220 may detect the presence or absence of a touch on the display panel 110 and touch coordinates based on the data received from the touch driving circuit 210.

Figure 3:
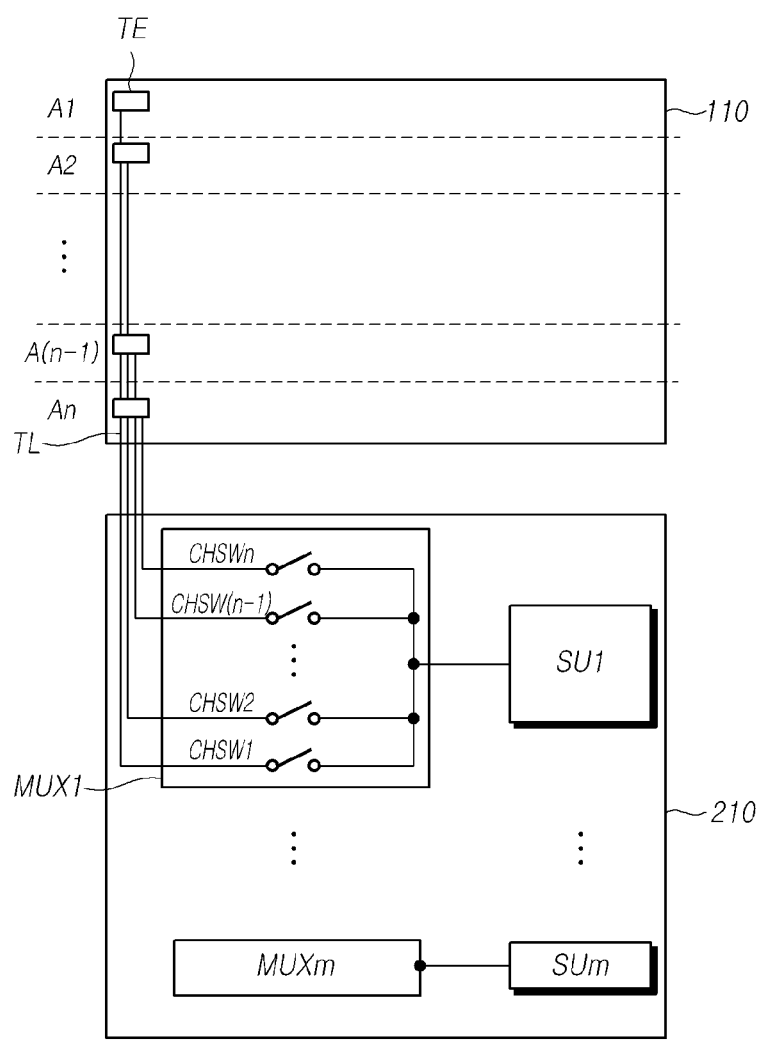
FIG. 3 is a diagram exemplarily illustrating a configuration of a touch driving circuit according to embodiments of the present disclosure.

FIG. 3 is a diagram exemplarily illustrating a configuration of a touch driving circuit 210 according to embodiments of the present disclosure.

Referring to FIG. 3, the touch driving circuit 210 may include a plurality of sensing units SU1 to SUm and a plurality of multiplexers MUX1 to MUXm. Each of the plurality of multiplexers MUX1 to MUXm may include a plurality of channel switches CHSW1 to CHSWn.

Sensing units SU may drive a plurality of touch electrodes TE disposed in a display panel 110 through multiplexers MUX.

As an example, a first sensing unit SU1 may be electrically connected to a first multiplexer MUX1. The first multiplexer MUX1 may include N channel switches CHSW1 to CHSWn (here, N is an integer greater than or equal to 2).

Each of the N channel switches CHSW1 to CHSWn may be electrically connected to a touch line TL. The first multiplexer MUX1 may be electrically connected to N touch electrodes TE disposed in the display panel 110 through the N channel switches CHSW1 to CHSWn. As the first multiplexer MUX1 is driven, the first sensing unit SU1 may detect a touch sensing signal by driving the N touch electrodes TE for the display panel 110.

The N touch electrodes TE driven by the first sensing unit SU1 may be disposed, for example, in a plurality of areas of the display panel 110. As shown in FIG. 3, the display panel 110 may be divided into N areas A1, A2, ..., A(n-1), and An, and each of the N touch electrodes TE driven by the first sensing unit SU1 may be disposed in a respective one of the N areas A1, A2, ..., A(n-1), and An.

In this case, a length of the touch line TL connecting the touch electrode TE disposed in a first area A1 and the touch driving circuit 210 and and a length of the touch line TL connecting the touch electrode TE disposed in an $N^{th}$ area An and the touch driving circuit 210 may have a great difference.

A load deviation on the touch lines TL may occur due to a difference in length between the touch lines TL connecting the touch electrodes TE and the touch driving circuit 210. Due to the load deviation, the sensitivity of touch sensing may be different according to positions at which the touch electrodes TE are disposed.

Embodiments of the present disclosure may provide a method capable of reducing a load deviation between the touch lines TL and performing touch sensing by variably controlling a driving method of channel switches CHSW included in the multiplexer MUX during a touch sensing period.

Figure 4A:
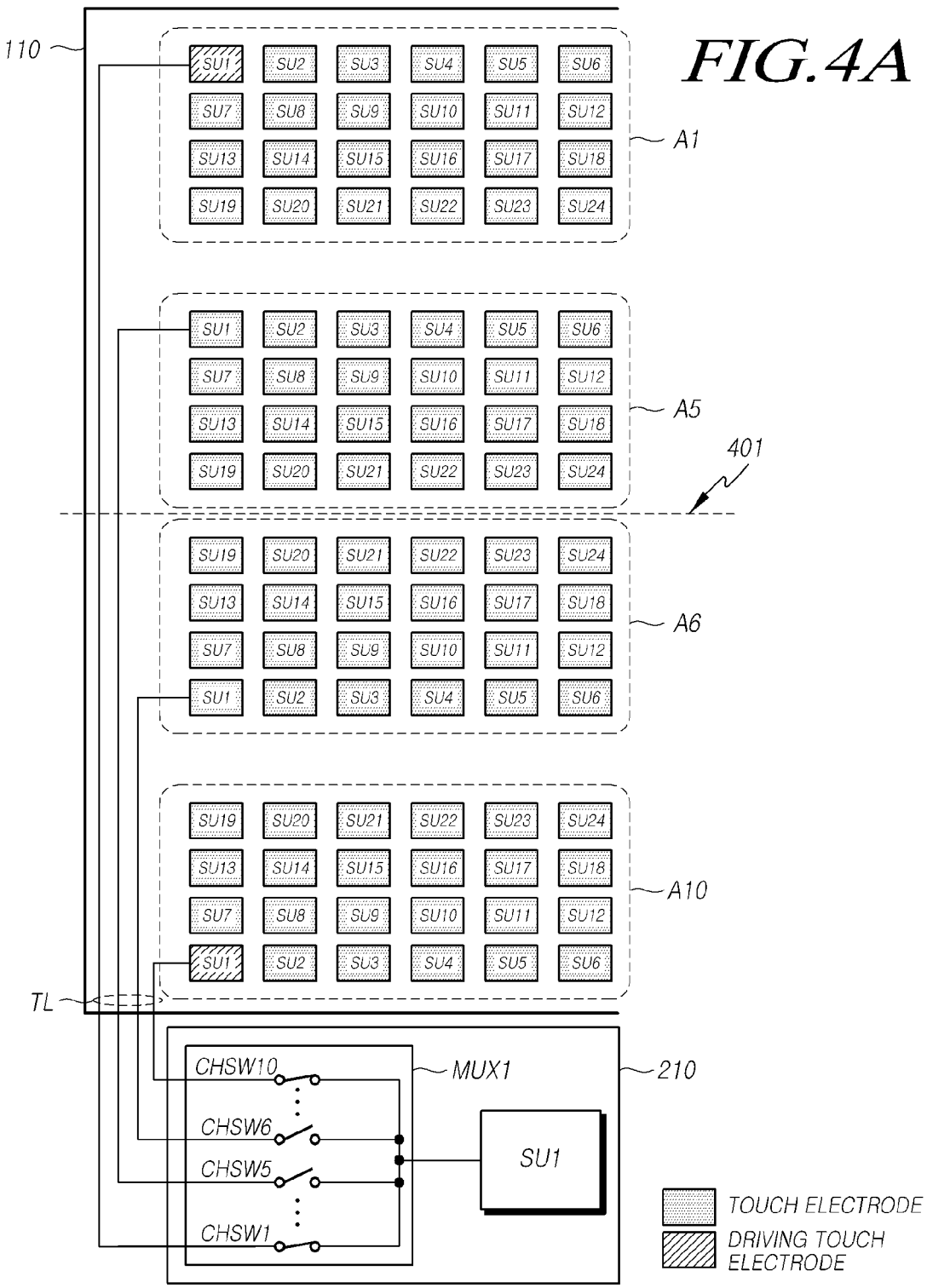
FIGS. 4A and 4B are diagrams exemplarily illustrating a driving method of a touch driving circuit according to embodiments of the present disclosure.
Figure 4B:
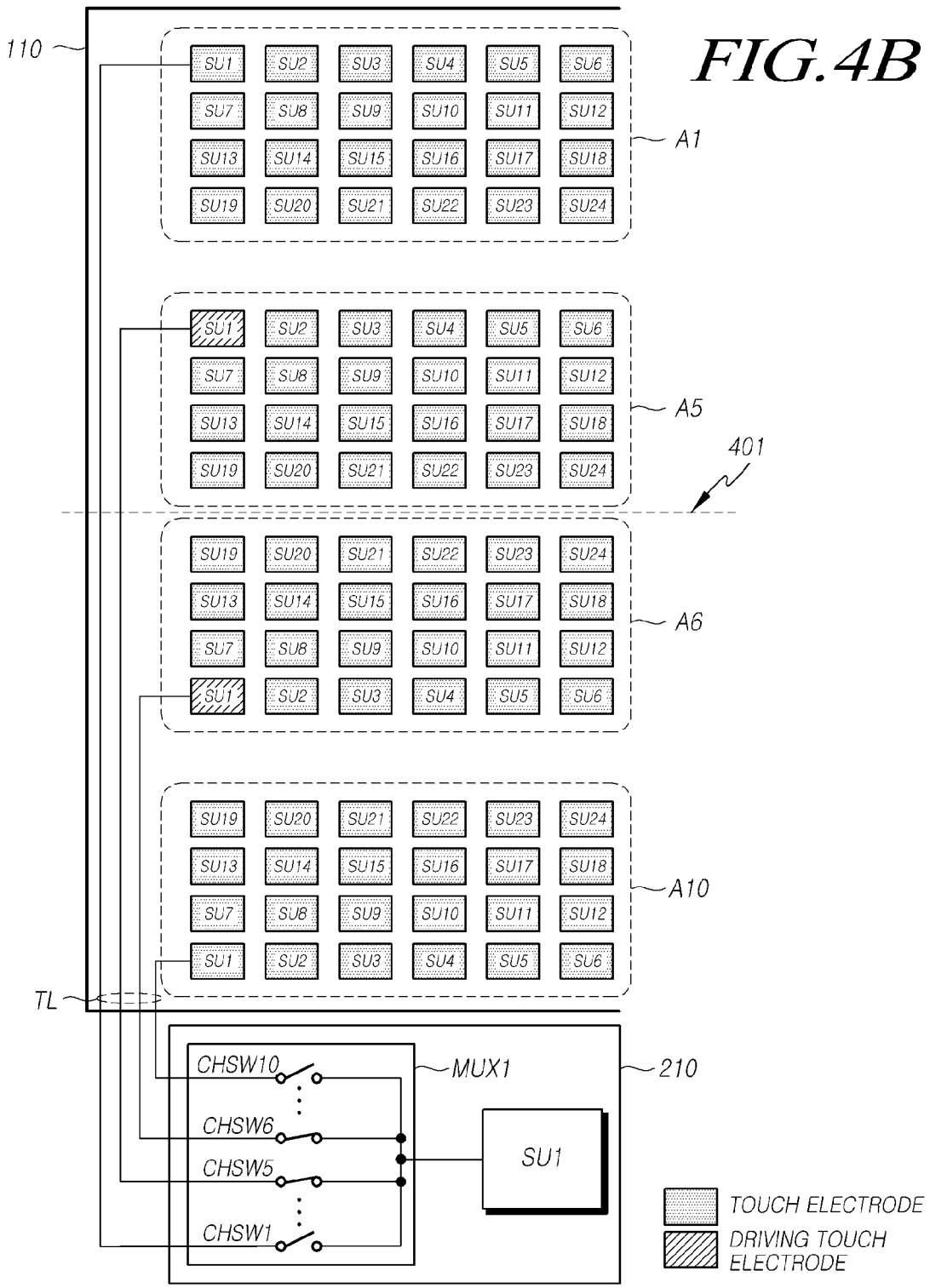

FIGS. 4A and 4B are diagrams exemplarily illustrating a driving method of a touch driving circuit 210 according to embodiments of the present disclosure.

Referring to FIGS. 4A and 4B, an example in which a display panel 110 is divided into ten areas A1 to A10 is shown.

A plurality of touch electrodes TE may be disposed in each of the ten areas A1 to A10. The touch electrodes TE driven by a plurality of sensing units SU may be disposed in each area.

As an example, a touch electrode TE driven by a first sensing unit SU1 to a touch electrode TE driven by a twenty-fourth sensing unit SU24 may be disposed in each area. Since the number of divided areas and the number of sensing units SU for driving the touch electrodes TE disposed in each area are merely an example, embodiments of the present disclosure are not limited to the example shown in FIG. 4A.

The touch electrode TE driven by the first sensing unit SU1 among the plurality of sensing units SU included in the touch driving circuit 210 may be disposed in each of the ten areas A1 to A10.

The first sensing unit SU1 may drive the touch electrodes TE disposed in the ten areas A1 to A10 through a first multiplexer MUX1.

As an example, the first multiplexer MUX1 may include ten channel switches CHSW1 to CHSW10.

A first channel switch CHSW1 included in the first multiplexer MUX1 may be electrically connected to a touch electrode TE disposed in a first area A1 of the display panel 110. A tenth channel switch CHSW10 included in the first multiplexer MUX1 may be electrically connected to a touch electrode TE disposed in a tenth area A10 of the display panel 110.

During a period in which the first channel switch CHSW1 included in the first multiplexer MUX1 is turned on, the first sensing unit SU1 may perform sensing by driving the touch electrode TE disposed in the first area A1. During a period in which the tenth channel switch CHSW10 included in the first multiplexer MUX1 is turned on, the first sensing unit SU1 may perform sensing by driving the touch electrode TE disposed in the tenth area A10.

In addition, the first sensing unit SU1 may perform sensing in a state in which two or more channel switches CHSW among the ten channel switches CHSW1 to CHSW10 included in the first multiplexer MUX1 are turned on.

As an example shown in FIG. 4A, the first channel switch CHSW1 and the tenth channel switch CHSW10 included in the first multiplexer MUX1 may be simultaneously driven. The first channel switch CHSW1 and the tenth channel switch CHSW10 may be turned on together.

The first channel switch CHSW1 and the tenth channel switch CHSW10 may be turned on to be short-circuited to each other. A touch line TL electrically connected to the first channel switch CHSW1 and a touch line TL electrically connected to the tenth channel switch CHSW10 may be short-circuited to each other.

Since the first channel switch CHSW1 and the tenth channel switch CHSW10 are in a turned-on state, the first sensing unit SU1 may perform touch sensing by simultaneously driving the touch electrode TE disposed in the first area A1 and the touch electrode TE disposed in the tenth area A10.

In addition, as in an example shown in FIG. 4B, a fifth channel switch CHSW5 and a sixth channel switch CHSW6 included in the first multiplexer MUX1 may be simultaneously driven. The fifth channel switch CHSW5 and the sixth channel switch CHSW6 may be turned on together.

The fifth channel switch CHSW5 and the sixth channel switch CHSW6 may be turned on to be short-circuited to each other.

In a state in which the fifth channel switch CHSW5 and the sixth channel switch CHSW6 are turned on, the first sensing unit SU1 may perform touch sensing by simultaneously driving a touch electrode TE disposed in a fifth area A5 and a touch electrode TE disposed in a sixth area A6.

Referring to FIGS. 4A and 4B, the first area A1 of the display panel 110 may be an area positioned farthest from the touch driving circuit 210. The tenth area A10 of the display panel 110 may be an area positioned closest to the touch driving circuit 210.

A length of the touch line TL electrically connecting the touch electrode TE disposed in the first area A1 and the touch driving circuit 210 may be the longest. A length of the touch line TL electrically connecting the touch electrode TE disposed in the tenth area A10 and the touch driving circuit 210 may be the shortest.

The touch electrode TE disposed in the first area A1 in which a load due to the touch line TL is the greatest and the touch electrode TE disposed in the tenth area A10 in which a load due to the touch line TL is the smallest may be simultaneously driven to perform touch sensing. A load due to the touch line TL may be determined to correspond to the sum of the length of the touch line TL connected to the touch electrode TE disposed in the first area A1 and the length of the touch line TL connected to the touch electrode TE disposed in the tenth area A10.

Similarly, in the case of the example shown in FIG. 4B, the touch electrode TE disposed in the fifth area A5 and the touch electrode TE disposed in the sixth area A6 may be simultaneously driven to perform touch sensing. In this case, a load due to the touch line TL may be determined to correspond to the sum of a length of the touch line TL connected to the touch electrode TE disposed in the fifth area A5 and a length of the touch line TL connected to the touch electrode TE disposed in the sixth area A6.

A portion indicated by 401 shown in FIGS. 4A and 4B may be a center of the display panel 110 or a reference line adjacent to the center of the display panel 110. The first area A1 and the tenth area A10 may be positioned symmetrically to each other with respect to the portion indicated by 401. The fifth area A5 and the sixth area A6 may be positioned symmetrically to each other with respect to the portion indicated by 401.

Two touch electrodes TE disposed in two areas positioned symmetrically to each other may be simultaneously driven to perform touch sensing.

Since the two touch electrodes TE are disposed in the areas positioned symmetrically to each other, the sum of lengths of the touch lines TL connected to the two touch electrodes TE may be constant or may be included within a certain range.

As an example, the sum of the length of the touch line TL connected to the touch electrode TE disposed in the first area A1 and the length of the touch line TL connected to the touch electrode TE disposed in the tenth area A10 may be the same as or similar to the sum of the length of the touch line TL connected to the touch electrode TE disposed in the fifth area A5 and the length of the touch line TL connected to the touch electrode TE disposed in the sixth area A6.

A load due to the touch line TL when the first channel switch CHSW1 and the tenth channel switch CHSW10 are turned on to perform touch sensing may be the same as or similar to a load due to the touch line TL when the fifth channel switch CHSW5 and the sixth channel switch CHSW6 are turned on to perform touch sensing.

During each touch sensing, a load deviation due to the touch lines TL may be reduced. Since the load deviation due to the touch lines TL is reduced, a deviation between touch sensing signals may be reduced.

In addition, in order to further reduce the load deviation due to the touch lines TL, arrangement structures of the touch electrodes TE driven by the sensing unit SU may be different according to areas.

As an example, in the first area A1 and the fifth area A5 positioned above the portion indicated by 401, the touch electrodes TE driven by the first sensing unit SU1 may be positioned at an uppermost side. The touch electrodes TE driven by other sensing units SU may be sequentially disposed in the first area A1 and the fifth area A5.

On the other hand, in the sixth area A6 and the tenth area A10 positioned below the portion indicated by 401, the touch electrodes TE driven by the first sensing unit SU1 may be positioned at a lowermost side. The touch electrodes TE driven by other sensing units SU may be disposed in the sixth area A6 and the tenth area A10 in reverse order.

As an example, a structure in which the touch electrode TE driven by the first sensing unit SU1 and a touch electrode TE driven by a seventh sensing unit SU7 are arranged in the first area A1 may be different from a structure in which the touch electrode TE driven by the first sensing unit SU1 and the touch electrode TE driven by the seventh sensing unit SU7 are arranged in the tenth area A10. In the first area A1, the touch electrode TE driven by the first sensing unit SU1 may be positioned above the touch electrode TE driven by the seventh sensing unit SU7. In the tenth area A10, the touch electrode TE driven by the first sensing unit SU1 may be positioned below the touch electrode TE driven by the seventh sensing unit SU7. Such two arrangement structures may be symmetrical to each other on the basis of the portion indicated by 401.

Accordingly, in a structure in which the touch electrodes TE driven by each sensing unit SU are arranged symmetrically to each other, since touch sensing is performed by simultaneously driving the touch electrodes TE arranged symmetrically to each other, a load deviation due to the touch lines TL can be reduced during each touch sensing.

Although a case in which two channel switches CHSW among the channel switches CHSW included in a multiplexer MUX are turned on and short-circuited to each other to perform touch sensing in the above-described example, two or more channel switches CHSW may be turned on and short-circuited to each other to perform touch sensing.

As an example, 2k channel switches CHSW may be turned on and short-circuited to each other to perform touch sensing (here, k is an integer greater than or equal to 1).

Alternatively, in some cases, an odd number of channel switches CHSW may be turned on and short-circuited to each other to perform touch sensing.

Even in this case, a combination of the two or more channel switches CHSW may be determined such that the sum of loads due to the touch lines TL connected to the two or more channel switches CHSW is constant or included within a certain range.

As described above, through a method of simultaneously driving the channel switches CHSW in the multiplexer MUX, it is possible to acquire sensing data by reducing a load deviation caused by the touch lines TL according to areas in which the touch electrodes TE are disposed.

When the above-described touch sensing data is primarily acquired, the touch sensing system 200 may secondarily perform touch sensing for accurate touch sensing.

FIGS. 5 to 9 show diagrams illustrating various examples of a driving method of a touch driving circuit 210 according to embodiments of the present disclosure.

Figure 5:
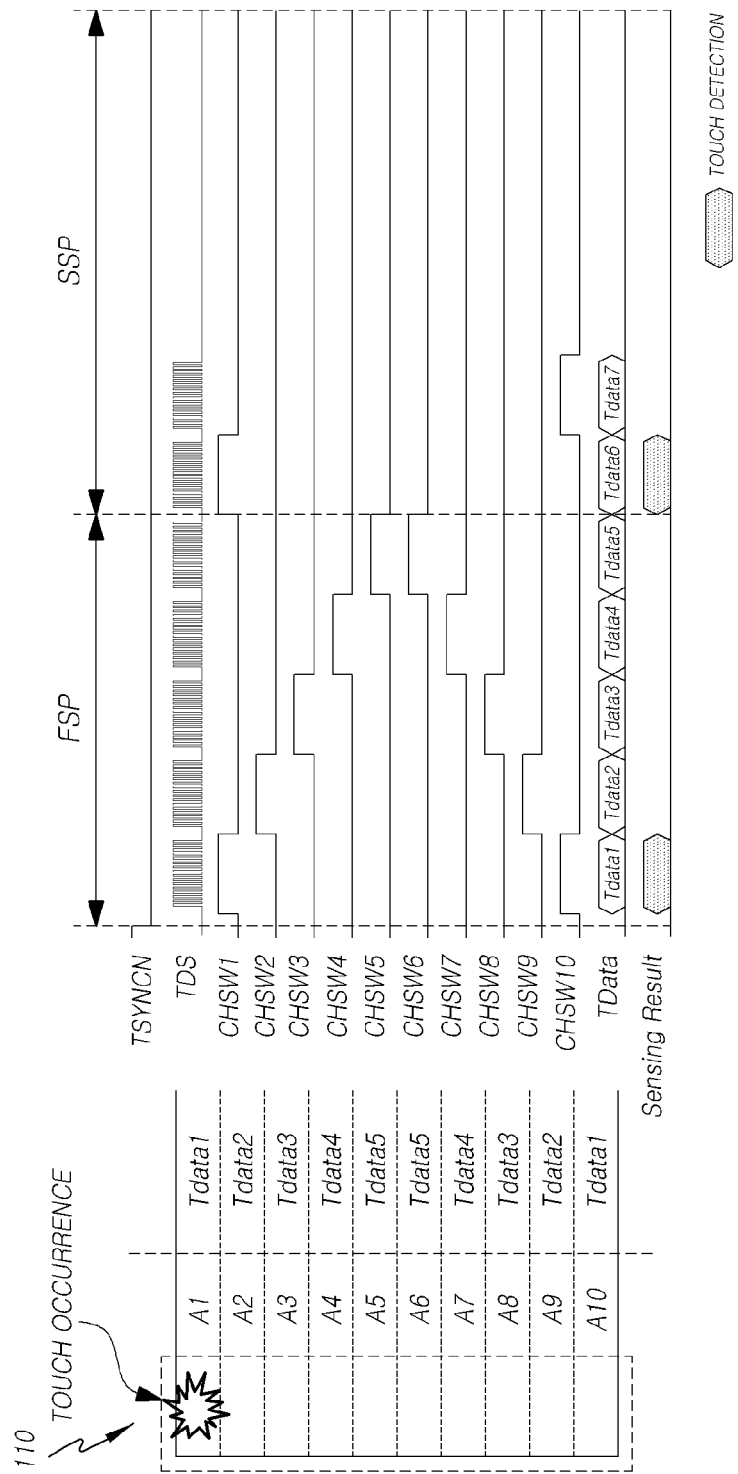
FIGS. 5 to 9 show diagrams illustrating various examples of a driving method of a touch driving circuit according to embodiments of the present disclosure.

Referring to FIG. 5, an example is shown in which a multiplexer MUX includes ten channel switches CHSW1 to CHSW10 and a display panel 110 is divided into ten areas A1 to A10 to perform touch sensing.

Each of the ten channel switches CHSW1 to CHSW10 may be electrically connected to touch electrodes TE disposed in each of the ten areas A1 to A10.

A touch sensing system 200 may perform touch sensing during a first sensing period FSP and a second sensing period SSP.

Touch sensing may be performed, for example, during a period in which a touch synchronization signal TSYNCN has a low level. During a period of a touch sensing period in which channel switches CHSW are turned on, a touch driving signal TDS may be supplied to the touch electrode TE, and then touch sensing may be performed.

During the first sensing period FSP, two channel switches CHSW among the channel switches CHSW included in a multiplexer MUX may be turned on and short-circuited to each other to perform touch sensing. Each of the two channel switches CHSW turned on together may be electrically connected to a respective one of the touch electrodes TE disposed in areas positioned symmetrically to each other in the display panel 110.

As an example, during the first sensing period FSP, a first channel switch CHSW1 and a tenth channel switch CHSW10 may be turned on and short-circuited to each other to perform touch sensing. First touch data Tdata1 may be acquired in a corresponding period.

During the first sensing period FSP, a second channel switch CHSW2 and a ninth channel switch CHSW9 may be turned on and short-circuited to each other to perform touch sensing. Second touch data Tdata2 may be acquired in a corresponding period.

Similarly, two channel switches CHSW connected to the touch electrodes TE disposed in areas positioned symmetrically to each other may be turned on and short-circuited to each other to perform touch sensing. Touch data Tdata3, touch data Tdata4, or touch data Tdata5 may be acquired in each period.

Touch data Tdata acquired in the first sensing period FSP may be data acquired by touch sensing performed in a state in which a load deviation due to touch lines TL is reduced.

Since two channel switches CHSW are turned on together to perform touch sensing during the first sensing period FSP, in order to accurately determine an area in which a touch is performed, touch sensing may be performed during the second sensing period SSP.

The touch driving circuit 210 may compare the acquired touch data Tdata with a preset threshold value to determine whether to perform touch sensing during the second sensing period SSP. Alternatively, a touch controller 220 may determine whether to perform secondary sensing based on data received from the touch driving circuit 210 and may transmit a command for performing the secondary sensing to the touch driving circuit 210.

As an example shown in FIG. 5, a touch may occur in a first area A1.

In this case, a touch may be detected in a period of the first sensing period FSP in which the first channel switch CHSW1 and the tenth channel switch CHSW10 are turned on to perform touch sensing.

During the second sensing period SSP, the first channel switch CHSW1 may be turned on to perform touch sensing. During the second sensing period SSP, the tenth channel switch CHSW10 may be turned on to perform touch sensing.

Two channel switches CHSW turned on when a touch is detected in the first sensing period FSP may be sequentially turned on to perform touch sensing during the second sensing period SSP.

Accordingly, at least one of the number of times that and the number of periods in which the channel switch CHSW included in the multiplexer MUX is turned on in the second sensing period SSP may be less than at least one of the number of times that and the number of periods in which the channel switch CHSW included in the multiplexer MUX is turned on in the first sensing period FSP.

As an example shown in FIG. 5, the number of times that the channel switch CHSW is turned on in the second sensing period SSP is twice, which is less than ten, which is the number of times that the channel switch CHSW is turned on in the first sensing period FSP.

In addition, the number of periods in which the channel switch CHSW is turned on in the second sensing period SSP is two, which is less than five, which is the number of periods in which the channel switch CHSW is turned on in the first sensing period FSP. In some cases, the number of periods in which the channel switch CHSW is turned on during the first sensing period FSP may be ten, and even in this case, the number of periods in which the channel switch CHSW is turned on in the second sensing period SSP may be less than the number of periods in which the channel switch CHSW is turned on in the first sensing period FSP.

As described above, each of the ten channel switches CHSW1 to CHSW10 included in the multiplexer MUX may be provided to be turned on at least one time during the first sensing period FSP, and at least one of the ten channel switches CHSW1 to CHSW10 included in the multiplexer MUX may be provided to not be turned on during the second sensing period SSP.

The sum of periods in which the ten channel switches CHSW1 to CHSW10 included in the multiplexer MUX are turned on during the second sensing period SSP may be less than the sum of periods in which the ten channel switches CHSW1 to CHSW10 included in the multiplexer MUX are turned on during the first sensing period FSP. As described above, in the example shown in FIG. 5, the sum of periods in which the ten channel switches CHSW1 to CHSW10 are turned on during the first sensing period FSP may be regarded as five periods and may also be regarded as ten periods in some cases.

In the second sensing period SSP, a touch may be detected in a period in which the first channel switch CHSW1 is turned on.

In this case, a value of sixth touch data Tdata6 acquired in the second sensing period SSP may be less than a value of the first touch data Tdata1 acquired in the first sensing period FSP.

During the second sensing period SSP, since sensing is performed in the touch electrode TE disposed in the first area A1 positioned farthest from the touch driving circuit 210, a load due to the touch line TL may be great.

On the other hand, during the first sensing period FSP, since sensing is performed by simultaneously driving the touch electrode TE disposed in the first area A1 and the touch electrode TE disposed in a tenth area A10, a load due to the touch line TL may be close to an average of all loads.

Accordingly, a load due to the touch line TL when touch sensing is performed during the first sensing period FSP may be less than a load due to the touch line TL when touch sensing is performed during the second sensing period SSP. A value of the sixth touch data Tdata6 may be less than a value of the first touch data Tdata1.

As another example, a touch may be detected in a period of the second sensing period SSP in which the tenth channel switch CHSW10 is turned on.

The tenth area A10 in which the touch electrode TE electrically connected to the tenth channel switch CHSW10 is disposed may be disposed closest to the touch driving circuit 210.

In this case, a value of seventh touch data Tdata7 acquired in the second sensing period SSP may be greater than the value of the first touch data Tdata1 acquired in the first sensing period FSP.

As in the example shown in FIG. 5, when a touch is detected through the first touch data Tdata1 acquired in the first sensing period FSP, and a touch is detected through the sixth touch data Tdata6 acquired in the second sensing period SSP, the touch sensing system 200 may determine that a touch is detected in the touch electrode TE disposed in the first area A1.

The touch sensing system 200 may perform touch sensing based on the first touch data Tdata1 acquired in the first sensing period FSP rather than the sixth touch data Tdata6 in which a load deviation of the touch line TL is reflected and which is acquired in the second sensing period SSP.

In this case, the touch driving circuit 210 may transmit the first touch data Tdata1 acquired in the first sensing period FSP to the touch controller 220. Alternatively, the touch driving circuit 210 may transmit both the first touch data Tdata1 and the sixth touch data Tdata6 to the touch controller 220, and the touch controller 220 may determine a touch based on the first touch data Tdata1.

As described above, since two channel switches CHSW electrically connected to the touch electrodes TE disposed symmetrically to each other are turned on together to acquire the touch data Tdata, it is possible to acquire the touch data Tdata in which a load deviation between the touch lines TL is reduced.

Touch sensing is performed using the touch data Tdata in which a load deviation between the touch lines TL is reduced, thereby improving the performance of the touch sensing.

In addition, primary sensing is performed by simultaneously driving two channel switches CHSW, and secondary sensing is performed by sequentially driving some channel switches CHSW, thereby reducing the overall sensing period or power consumption according to the performing of sensing.

In some cases, a touch may occur in a plurality of areas, and even in this case, the channel switch CHSW driven during the second sensing period SSP may be varied to perform touch sensing using the touch data Tdata in which a load deviation between the touch lines TL is reduced.

Figure 6:
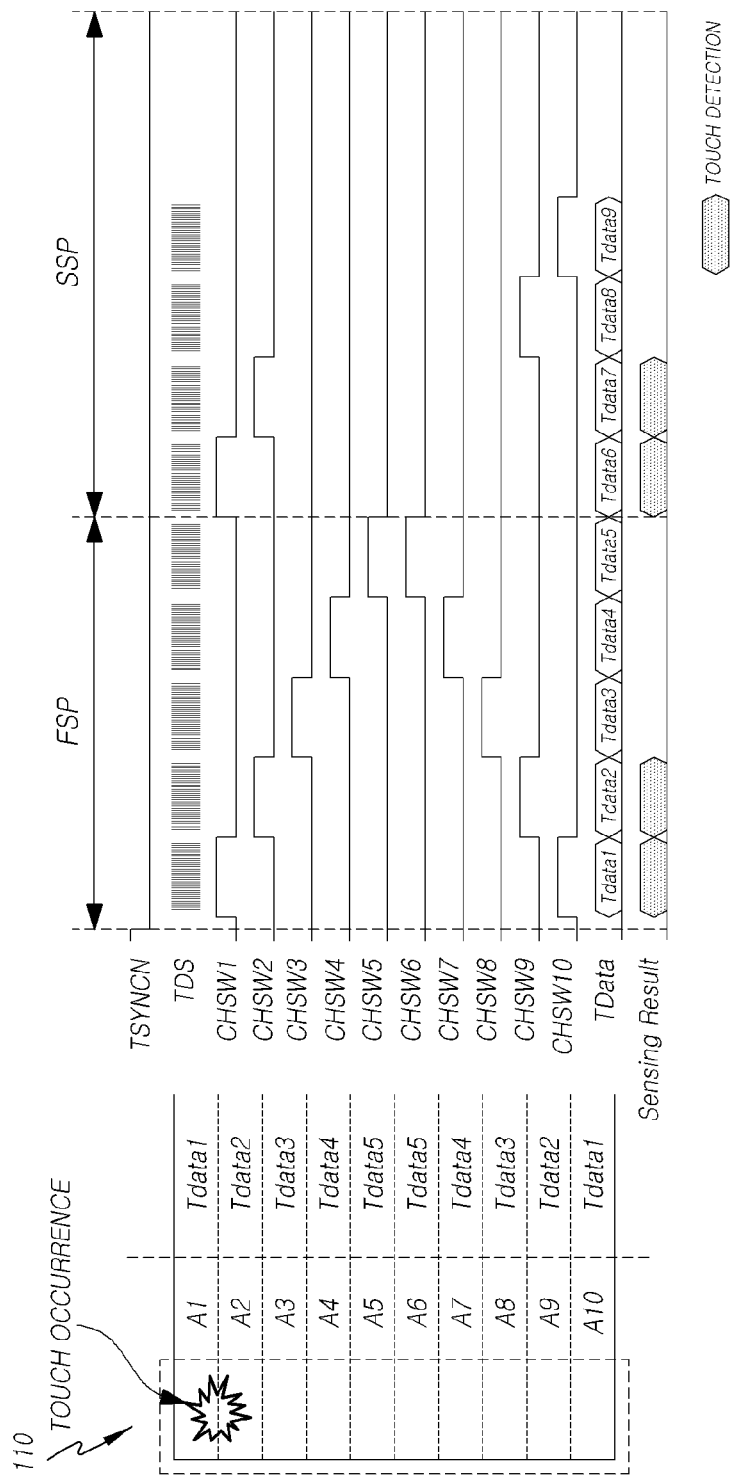

As an example, referring to FIG. 6, a touch may occur in a boundary area between a first area A1 and a second area A2.

As in the example described with reference to FIG. 5, a touch sensing system 200 may perform touch sensing by turning two channel switches CHSW on among ten channel switches CHSW1 to CHSW10 during a first sensing period FSP. The two channel switches CHSW turned on and short-circuited to each other may be electrically connected to touch electrodes TE disposed in areas positioned symmetrically to each other in a display panel 110.

Since a touch occurs in the boundary area between the first area A1 and the second area A2, the touch may be detected through first touch data Tdata1 acquired in a period of the first sensing period FSP in which a first channel switch CHSW1 and a tenth channel switch CHSW10 are turned on together. In addition, a touch may be detected through second touch data Tdata2 acquired in a period of the first sensing period FSP in which a second channel switch CHSW2 and a ninth channel switch CHSW9 are turned on together.

Based on a sensing result detected in the first sensing period FSP, during the second sensing period SSP, the touch sensing system 200 may perform touch sensing by sequentially driving the first channel switch CHSW1, the second channel switch CHSW2, the ninth channel switch CHSW9, and the tenth channel switch CHSW10. Even in this case, since only four channel switches CHSW1, CHSW2, CHSW9, and CHSW10 are driven during the second sensing period SSP, the number of times that and the number of periods in which the channel switch CHSW is turned on in the second sensing period SSP may be less than the number of times that and the number of periods in which the channel switch CHSW is turned on in the first sensing period FSP.

A touch may be detected through sixth touch data Tdata6 acquired in a period of the second sensing period SSP in which the first channel switch CHSW1 is turned on. A touch may be detected through seventh touch data Tdata7 acquired in a period of the second sensing period SSP in which the second channel switch CHSW2 is turned on.

The touch sensing system 200 may determine a touch based on a sensing result of the first sensing period FSP and a sensing result of the second sensing period SSP.

The touch sensing system 200 may determine a touch position based on the sensing result of the second sensing period SSP and may determine touch sensitivity or the like based on touch data Tdata acquired in the first sensing period FSP. Accordingly, it is possible to perform touch sensing using the touch data Tdata in which a load deviation between touch lines TL is reduced.

Even when two or more touches occur in a plurality of areas, the touch sensing system 200 may perform touch sensing through such a method.

Figure 7:
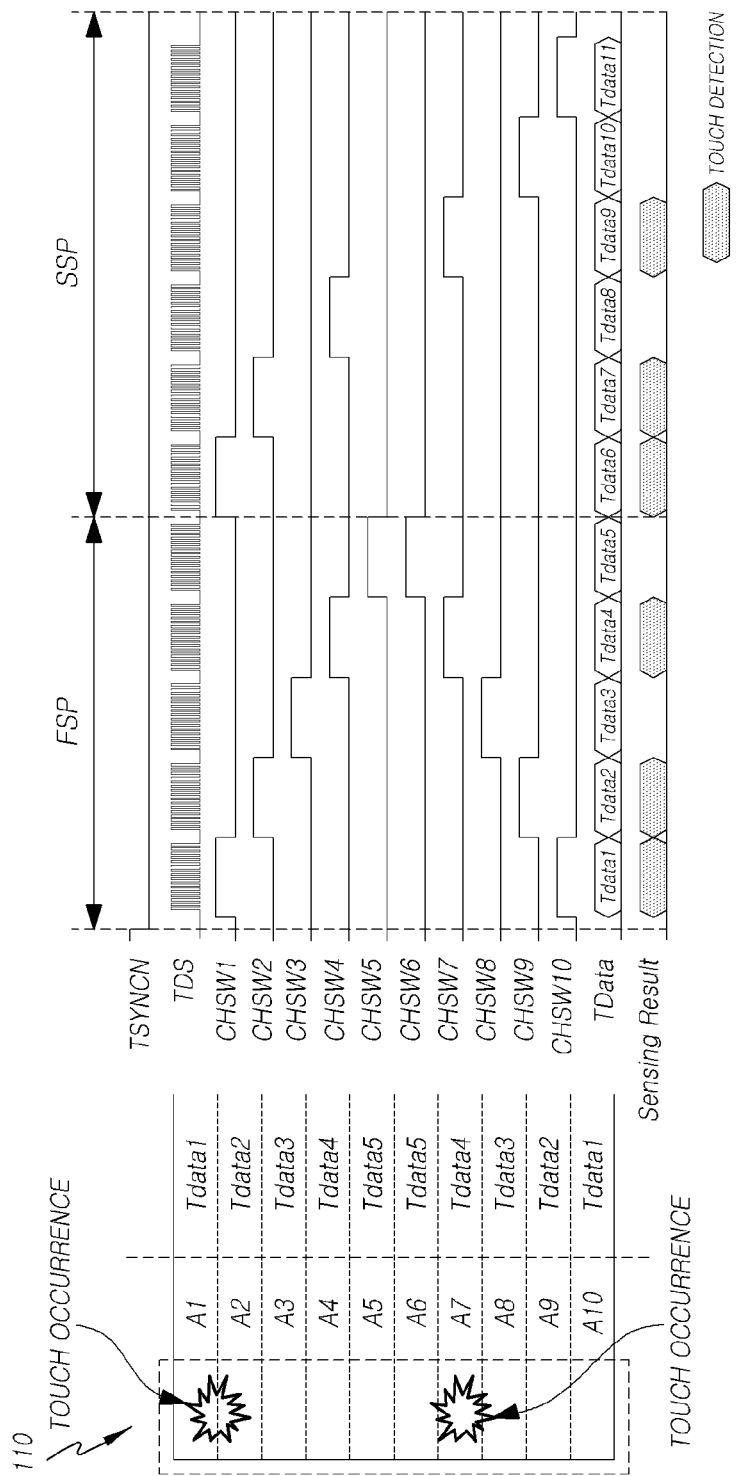

Referring to FIG. 7, an example in which touches occur in a seventh area A7 and a boundary area between a first area A1 and a second area A2 is shown.

A touch sensing system 200 may perform touch sensing by turning two channel switches CHSW on, among ten channel switches CHSW1 to CHSW10, during a first sensing period FSP.

A touch may be detected through first touch data Tdata1 acquired in a period of the first sensing period FSP in which a first channel switch CHSW1 and a tenth channel switch CHSW10 are turned on together. A touch may be detected through second touch data Tdata2 acquired in a period in which a second channel switch CHSW2 and a ninth channel switch CHSW9 are turned on together. A touch may be detected through fourth touch data Tdata4 acquired in a period in which a fourth channel switch CHSW4 and a seventh channel switch CHSW7 are turned on together.

The touch sensing system 200 may perform touch sensing during a second sensing period SSP according to a sensing result of the first sensing period FSP.

The touch sensing system 200 may perform touch sensing by sequentially driving the first channel switch CHSW1, the second channel switch CHSW2, the fourth channel switch CHSW4, the seventh channel switch CHSW7, the ninth channel switch CHSW9, and the tenth channel switch CHSW10.

A touch may be detected through sixth touch data Tdata6 acquired in a period of the second sensing period SSP in which the first channel switch CHSW1 is turned on. A touch may be detected through seventh touch data Tdata7 acquired in a period in which the second channel switch CHSW2 is turned on. A touch may be detected through ninth touch data Tdata9 acquired in a period in which the seventh channel switch CHSW7 is turned on.

Even when two or more touches occur simultaneously in a plurality areas, as in the above-described example, the touch sensing system 200 may perform primary sensing and secondary sensing to acquire touch data Tdata in which a load deviation between touch lines TL is reduced, thereby performing touch sensing.

Figure 8:
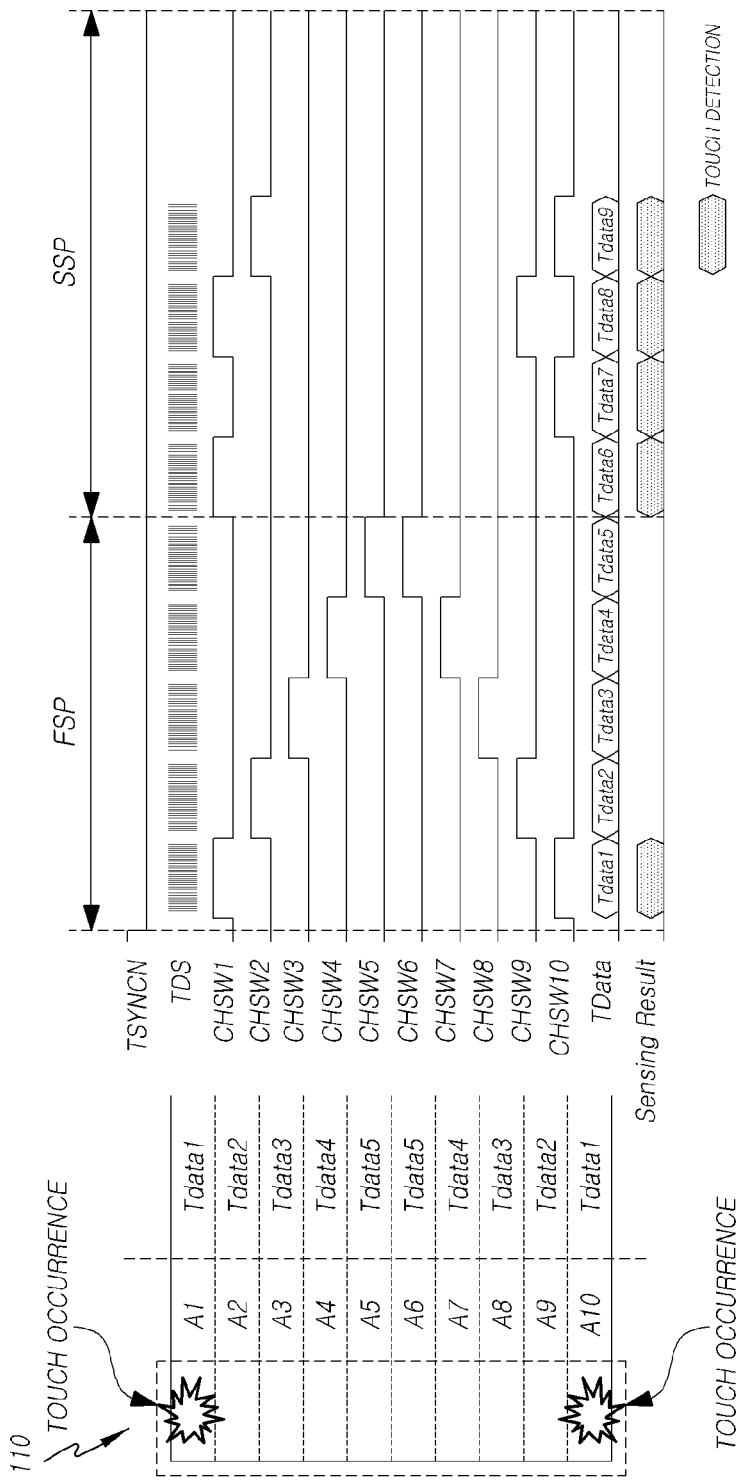

FIG. 8 illustrates another example in which two or more touches occur simultaneously in a plurality of areas.

Referring to FIG. 8, touches may occur simultaneously in a first area A1 and a tenth area A10.

A touch sensing system 200 may perform touch sensing by turning two channel switches CHSW on during a first sensing period FSP.

Since touches occur in the first area A1 and the tenth area A10, the touches may be detected in a period in which a first channel switch CHSW1 and a tenth channel switch CHSW10 are turned on together.

Based on a sensing result of the first sensing period FSP, during a second sensing period SSP, the touch sensing system 200 may perform touch sensing by sequentially driving the first channel switch CHSW1 and the tenth channel switch CHSW10.

A touch may be detected through each of sixth touch data Tdata6 acquired in a period in which the first channel switch CHSW1 is turned on and seventh touch data Tdata7 acquired in a period in which the tenth channel switch CHSW10 is turned on.

In this case, since the sixth touch data Tdata6 and the seventh touch data Tdata7 acquired in the second sensing period SSP may be touch data in which a load deviation between touch lines TL is reflected, the sixth touch data Tdata6 and the seventh touch data Tdata7 may not be used during touch sensing.

In addition, since first touch data Tdata1 acquired in the first sensing period FSP is data acquired in a period in which the first channel switch CHSW1 and the tenth channel switch CHSW10 are turned on together, the first touch data Tdata1 may not be used for sensing each of the touch in the first area A1 and the touch in the tenth area A10.

During the second sensing period SSP, the touch sensing system 200 may perform touch sensing by turning on two channel switches CHSW of a combination different from a combination in the first sensing period FSP.

As an example, during the second sensing period SSP, the first channel switch CHSW1 and a ninth channel switch CHSW9 may be turned on and short-circuited to each other to perform touch sensing. Excluding the tenth area A10, a ninth area A9 in which the touch electrode TE connected to the ninth channel switch CHSW9 is disposed may be an area positioned farthest from the first area A1.

During the second sensing period SSP, a second channel switch CHSW2 and the tenth channel switch CHSW10 may be turned on and short-circuited to each other to perform touch sensing. Excluding the first area A1, a second area A2 in which the touch electrode TE connected to the second channel switch CHSW2 is disposed may be an area positioned farthest from the tenth area A10.

Sensing may be performed on the touch in the first area A1 using eighth touch data Tdata8 acquired in a period in which the first channel switch CHSW1 and the ninth channel switch CHSW9 are turned on together.

Sensing may be performed on the touch in the tenth area A10 using ninth touch data Tdata9 acquired in a period in which the second channel switch CHSW2 and the tenth channel switch CHSW10 are turned on together.

Even when touches occur simultaneously in areas in which the touch electrodes TE, which are connected to channel switches CHSW turned on together during the first sensing period FSP, are disposed, since two channel switches CHSW of another combination are turned on together to perform touch sensing, it is possible to perform touch sensing using touch data Tdata acquired in a state in which a load deviation due to touch lines TL is reduced.

As described above, according to embodiments of the present disclosure, since touch sensing is performed by simultaneously driving two channel switches CHSW electrically connected to the touch electrodes TE positioned symmetrically to each other, the touch sensing can be performed while reducing a load deviation due to the touch lines TL.

Also, in some cases, even when a display panel 110 driven by a multiplexer MUX is divided into an odd number of areas, touch sensing through such a method can be performed.

Figure 9:
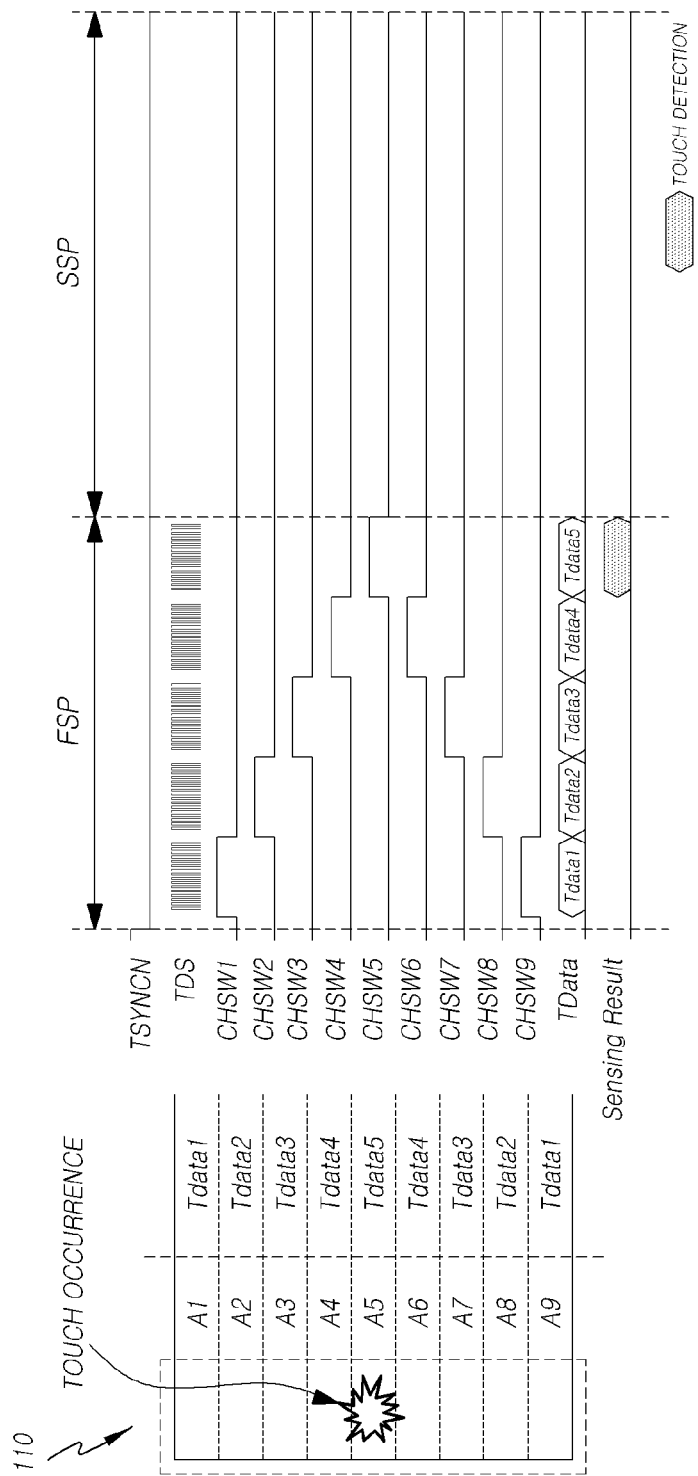

Referring to FIG. 9, an example in which a multiplexer MUX includes nine channel switches CHSW1 to CHSW9 is shown. A display panel 110 may be divided into nine areas A1 to A9.

During a first sensing period FSP, two channel switches CHSW, which drive touch electrodes TE disposed in areas disposed symmetrically to each other, may be turned on and short-circuited to each other to perform touch sensing.

When a touch electrode TE disposed in a fifth area A5 positioned at a center of the display panel 110 is driven, only a fifth channel switch CHSW5 may be turned on.

When a touch is detected in a period of the first sensing period FSP in which two channel switches CHSW are turned on together, as in the above-described example, touch sensing may be performed during a second sensing period SSP.

As in the example shown in FIG. 9, when a touch occurs in the fifth area A5, touch sensing may be possible using fifth touch data Tdata5 acquired in the first sensing period FSP. Touch sensing may not be performed during the second sensing period SSP.

Since only the fifth channel switch CHSW5 is turned on to perform touch sensing, a load may be less than a load when other two channel switches CHSW are turned on together to perform touch sensing.

As an example, when touch sensing is performed during a period in which only the fifth channel switch CHSW5 is turned on, a load of the touch line TL may be 1/2 of a load of the touch line TL when touch sensing is performed during a period in which two channel switches CHSW are turned on together.

In order to prevent or at least reduce the occurrence of a deviation between touch sensing signals due to such a load difference, a charge adjustment unit connected to the fifth channel switch CHSW5 may be set differently from a charge adjustment unit connected to other channel switches CHSW.

As an example, the sensitivity of a touch sensing signal obtained when the fifth channel switch CHSW5 is driven may be lowered to be similar to the sensitivity of a touch sensing signal obtained by simultaneously driving two channel switches CHSW.

Alternatively, in some cases, when a touch controller 220 determines a touch based on touch data Tdata acquired when the fifth channel switch CHSW5 is driven, the touch controller 220 may also determine touch sensitivity in consideration of a deviation due to a load of the touch line TL.

The above-described embodiments of the present disclosure will be briefly described below.

A touch display device 100 according to embodiments of the present disclosure may include a plurality of touch electrodes TE disposed in a display panel 110, a multiplexer MUX including N channel switches CHSW each electrically connected to one of N touch electrodes TE among the plurality of touch electrodes TE, wherein N is an integer greater than or equal to 2, and a sensing unit SU electrically connected to the multiplexer MUX.

2k channel switches CHSW among the N channel switches CHSW may be turned on and short-circuited to each other during at least a partial period of a first sensing period FSP, wherein k is an integer greater than or equal to 1. Each of the 2k channel switches CHSW may be turned on during a separate period in at least a partial period of a second sensing period SSP after the first sensing period FSP.

A first channel switch CHSW1 and an $N^{th}$ channel switch CHSWn among the N channel switches CHSW may be turned on and short-circuited to each other during a partial period of the first sensing period FSP.

The first channel switch CHSW1 may be electrically connected to a first touch electrode positioned farthest from the multiplexer MUX among the N touch electrodes TE. The $N^{th}$ channel switch CHSWn may be electrically connected to an $N^{th}$ touch electrode positioned closest to the multiplexer MUX among the N touch electrodes TE.

A second channel switch CHSW2 and an (N-1)$^{th}$ channel switch CHSW(n-1) among the N channel switches CHSW may be turned on and short-circuited to each other during another partial period of the first sensing period FSP.

The second channel switch CHSW2 may be electrically connected to a second touch electrode positioned adjacent to the first touch electrode and positioned closer to the multiplexer MUX than the first touch electrode among the N touch electrodes TE. The (N-1)$^{th}$ channel switch CHSW(n-1) may be electrically connected to an (N-1)$^{th}$ touch electrode positioned adjacent to the N$^{th}$ touch electrode and positioned farther from the multiplexer MUX than the N$^{th}$ touch electrode among the N touch electrodes TE.

When a touch is detected in a period of the first sensing period FSP in which the first channel switch CHSW1 and the N$^{th}$ channel switch CHSWn are turned on, each of the first channel switch CHSW1 and the N$^{th}$ channel switch CHSWn may be turned on during the separate period of the second sensing period SSP.

When a touch is detected in a period of the second sensing period SSP in which the first channel switch CHSW1 is turned on, a value of touch data Tdata acquired in the period of the second sensing period SSP in which the first channel switch CHSW1 is turned on may be less than a value of touch data Tdata acquired in the period of the first sensing period FSP in which the first channel switch CHSW1 and the N$^{th}$ channel switch CHSWn are turned on.

Alternatively, when a touch is detected in a period of the second sensing period SSP in which the N$^{th}$ channel switch CHSWn is turned on, a value of touch data Tdata acquired in the period of the second sensing period SSP in which the N$^{th}$ channel switch CHSWn is turned on may be greater than a value of touch data Tdata acquired in the period of the first sensing period FSP in which the first channel switch CHSW1 and the N$^{th}$ channel switch CHSWn are turned on.

Alternatively, in the second sensing period SSP, when a touch is detected in both a period in which the first channel switch CHSW1 is turned on and a period in which the N$^{th}$ channel switch CHSWn is turned on, during a partial period of the second sensing period SSP, an (N-1)$^{th}$ channel switch CHSW(n-1) electrically connected to an (N-1)$^{th}$ touch electrode adjacent to the N$^{th}$ touch electrode and the first channel switch CHSW1 may be turned on and short-circuited to each other. During another partial period of the second sensing period SSP, a second channel switch CHSW2 electrically connected to a second touch electrode adjacent to the first touch electrode and the N$^{th}$ channel switch CHSWn may be turned on and short-circuited to each other.

The display panel 110 may include a first area and a second area positioned symmetrically to each other. A structure in which the touch electrode TE driven by a first sensing unit and the touch electrode TE driven by a second sensing unit are disposed in the first area is symmetrical to a structure in which the touch electrode TE driven by the first sensing unit and the touch electrode driven TE by the second sensing unit are disposed in the second area.

When N is 2p, a p$^{th}$ channel switch CHSWp and a (p+1)$^{th}$ channel switch CHSW(p+1) may be turned on and short-circuited to each other during a partial period of the first sensing period FSP, wherein p is an integer greater than or equal to 1.

Alternatively, when N is (2p+1), in the first sensing period FSP, a (p+1)$^{th}$ channel switch CHSW(p+1) may be turned on during a period distinguished from periods in which other channel switches CHSW are turned on, wherein p is an integer greater than or equal to 1.

At least two of the 2k touch electrodes TE electrically connected to the 2k channel switches CHSW may be disposed symmetrically to each other in the display panel 110.

An order in which the N channel switches CHSW are turned on during the first sensing period FSP may be constant, and an order in which the N channel switches CHSW are turned on during the second sensing period SSP may be variable.

A touch display device 100 according to embodiments of the present disclosure includes a plurality of touch electrodes TE disposed in a display panel 110, a multiplexer MUX including N channel switches CHSW electrically connected to N touch electrodes TE among the plurality of touch electrodes TE, wherein N is an integer greater than or equal to 2, and a sensing unit SU electrically connected to the multiplexer MUX, wherein two or more channel switches CHSW among the N channel switches CHSW may be turned on and short-circuited to each other during at least a partial period of a first sensing period FSP, and each of the two or more channel switches CHSW may be turned on during a separate period in at least a partial period of a second sensing period SSP after the first sensing period FSP.

During the first sensing period FSP, each of the N channel switches CHSW may be turned on at least one time, and during the second sensing period SSP, at least one of the N channel switches CHSW may not be turned on.

The sum of periods in which the N channel switches CHSW are turned on during the second sensing period SSP may be less than the sum of periods in which the N channel switches CHSW are turned on during the first sensing period FSP.

A touch driving circuit 210 according to embodiments of the present disclosure includes a multiplexer MUX including N channel switches CHSW each electrically connected to one of N touch electrodes TE, wherein N is an integer greater than or equal to 2, and a sensing unit SU electrically connected to the multiplexer MUX, wherein 2k channel switches CHSW among the N channel switches CHSW may be turned on and short-circuited to each other during at least a partial period of a first sensing period FSP, wherein k is an integer greater than or equal to 1, and each of the 2k channel switches CHSW may be turned on during a separate period in at least a partial period of a second sensing period SSP after the first sensing period FSP.

According to the above-described embodiments of the present disclosure, the 2k channel switches CHSW for driving the touch electrodes TE disposed in areas positioned symmetrically to each other may be turned on so that 2k touch lines TL electrically connected to the 2k channel switches CHSW may be short-circuited to each other.

Since touch sensing is performed in a state in which the 2k touch lines TL electrically connected to the touch electrodes TE disposed in areas positioned symmetrically to each other are short-circuited to each other, it is possible to acquire touch data in which a load deviation due to the touch lines TL is reduced.

Accordingly, it is possible to provide a method capable of reducing a deviation in touch sensitivity due to a load difference between the touch lines TL according to areas of the display panel 110 and improving the performance of touch sensing.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
   a plurality of touch electrodes in a display panel;
   a multiplexer comprising N channel switches, each of the N channel switches electrically connected to a corresponding one of N touch electrodes among the plurality of touch electrodes, wherein N is an integer greater than or equal to 2; and
   a sensing unit electrically connected to the multiplexer, wherein:
   2k channel switches among the N channel switches are simultaneously turned on and short-circuited to each other during at least a partial period of a first sensing period, wherein k is an integer greater than or equal to 1; and
   at least two of the 2k channel switches are sequentially turned on during a separate period in at least a partial period of a second sensing period that is after the first sensing period.

2. The touch display device of claim 1, wherein:
   a first channel switch and an $N^{th}$ channel switch among the N channel switches are simultaneously turned on and short-circuited to each other during a first partial period of the first sensing period,
   wherein the first channel switch is electrically connected to a first touch electrode positioned farthest from the multiplexer among the N touch electrodes and the $N^{th}$ channel switch is electrically connected to an $N^{th}$ touch electrode positioned closest to the multiplexer among the N touch electrodes.

3. The touch display device of claim 2, wherein:
   a second channel switch and an $(N-1)^{th}$ channel switch among the N channel switches are simultaneously turned on and short-circuited to each other during a second partial period of the first sensing period, wherein the second channel switch is electrically connected to a second touch electrode positioned adjacent to the first touch electrode and positioned closer to the multiplexer than the first touch electrode among the N touch electrodes and the $(N-1)^{th}$ channel switch is electrically connected to an $(N-1)^{th}$ touch electrode positioned adjacent to the $N^{th}$ touch electrode and positioned farther from the multiplexer than the $N^{th}$ touch electrode among the N touch electrodes.

4. The touch display device of claim 2, wherein responsive to detecting a touch in a period of the first sensing period in which the first channel switch and the $N^{th}$ channel switch are simultaneously turned on, each of the first channel switch and the $N^{th}$ channel switch is sequentially turned on during the separate period of the second sensing period.

5. The touch display device of claim 4, wherein responsive to detecting a touch in a period of the second sensing period in which the first channel switch is turned on, a value of touch data acquired in the period of the second sensing period in which the first channel switch is turned on is less than a value of touch data acquired in the period of the first sensing period in which the first channel switch and the $N^{th}$ channel switch are simultaneously turned on.

6. The touch display device of claim 4, wherein, responsive to detecting a touch in a period of the second sensing period in which the $N^{th}$ channel switch is turned on, a value of touch data acquired in the period of the second sensing period in which the $N^{th}$ channel switch is turned on is greater than a value of touch data acquired in the period of the first sensing period in which the first channel switch and the $N^{th}$ channel switch are simultaneously turned on.

7. The touch display device of claim 4, wherein, in the second sensing period, responsive to detecting a touch in both a first period in which the first channel switch is turned on and a second period in which the $N^{th}$ channel switch is turned on after the first period, during a third period of the second sensing period, an $(N-1)^{th}$ channel switch electrically connected to an $(N-1)^{th}$ touch electrode that is adjacent to the $N^{th}$ touch electrode and the first channel switch are simultaneously turned on and short-circuited to each other, and during a fourth period of the second sensing period that is after the third period, a second channel switch electrically connected to a second touch electrode that is adjacent to the first touch electrode and the $N^{th}$ channel switch that is connected to the Nth touch electrode are simultaneously turned on and short-circuited to each other.

8. The touch display device of claim 1, wherein the display panel comprises a first area and a second area symmetrically positioned with respect to a reference line; and
   a structure in which a first touch electrode driven by a first sensing unit and a second touch electrode driven by a second sensing unit are disposed in the first area is symmetrical to a structure in which a first touch electrode driven by the first sensing unit and a second touch electrode driven by the second sensing unit are disposed in the second area.

9. The touch display device of claim 1, wherein, responsive to N being 2p, a $p^{th}$ channel switch and a $(p+1)^{th}$ channel switch are simultaneously turned on and short-circuited to each other during a partial period of the first sensing period, wherein p is an integer greater than or equal to 1.

10. The touch display device of claim 1, wherein, responsive to N being (2p+1), in the first sensing period, a $(p+1)^{th}$ channel switch is turned on during a period distinguished from periods in which other channel switches are turned on, wherein p is an integer greater than or equal to 1.

11. The touch display device of claim 1, wherein at least two of the 2k touch electrodes electrically connected to the 2k channel switches are disposed symmetrically to each other in the display panel with respect to a reference line.

12. The touch display device of claim 1, wherein:
    an order in which the N channel switches are turned on during the first sensing period is constant; and
    an order in which the N channel switches are turned on during the second sensing period is variable.

13. A touch display device comprising:
    a display panel including a plurality of touch electrodes;
    a multiplexer comprising a plurality of channel switches, each channel switch electrically connected to a corresponding touch electrode from the plurality of touch electrodes; and
    a sensing circuit electrically connected to the multiplexer, the sensing circuit configured to sense touch of the display panel during a first sensing period and during a second sensing period that is after the first sensing period, wherein during a first part of the first sensing period, a first channel switch from the plurality of channel switches that is connected to a first touch electrode from the plurality of touch electrodes is on and a second channel switch from the plurality of channel switches that is connected to a second touch electrode from the plurality of touch electrodes is on such that the first channel switch and the second channel switch are short-circuited to each other during the first part of the first sensing period, and during a first part of the second sensing period the first channel switch is on while the second channel switch is off and during a second part of the second sensing period that is after the first part the second channel switch is on while the first channel switch is off responsive to the sensing circuit sensing that at least one of the first touch electrode and the second touch electrode are touched during the first sensing period.

14. The touch display device of claim 13, wherein a distance between the first touch electrode and the multiplexer is different from a distance between the second touch electrode and the multiplexer, wherein responsive to detecting the touch of the first touch electrode in the first part of the second sensing period in which the first channel switch is on, a value of touch data acquired in the first part of the second sensing period in which the first channel switch is on is less than a value of touch data acquired in the first part of the first sensing period in which the first channel switch and the second channel switch are simultaneously on, and wherein responsive to detecting the touch of the second touch electrode in the second part of the second sensing period in which the second channel switch is on, a value of touch data acquired in the second part of the second sensing period in which the second channel switch is on is not less than the value of touch data acquired in the first part of the first sensing period in which the first channel switch and the second channel switch are simultaneously on.

15. The touch display device of claim 14, wherein a third channel switch and a fourth channel switch from the plurality of channel switches are simultaneously on and short-circuited to each other during a second part of the first sensing period that is after the first part of the first sensing period, wherein the third channel switch is electrically connected to a third touch electrode that is positioned adjacent to the first touch electrode and closer to the multiplexer than the first touch electrode, and the fourth channel switch is electrically connected to a fourth touch electrode that is positioned adjacent to the second touch electrode and is farther from the multiplexer than the second touch electrode.

16. The touch display device of claim 15, responsive to the sensing circuit detecting touch of the first touch electrode in the first part of the second sensing period and detecting touch of the second touch electrode in the second part of the second sensing period, during a third part of the second sensing period that is after the second part of the second sensing period, the fourth channel switch that is electrically connected to the fourth touch electrode that is adjacent to the second touch electrode and the first channel switch that is connected to the first touch electrode are simultaneously on and short-circuited to each other, and during a fourth part of the second sensing period that is after the third part, the third channel switch that is electrically connected to the third touch electrode that is adjacent to the first touch electrode and the second channel switch that is connected to the second touch electrode are simultaneously on and short-circuited to each other.

17. The touch display device of claim 15, wherein during the first sensing period, each of the plurality of channel switches is turned on at least one time, and during the second sensing period, at least one of the plurality of channel switches is not turned on.

18. The touch display device of claim 15, wherein a sum of periods in which the plurality of channel switches are turned on during the second sensing period is less than a sum of periods in which the plurality of channel switches are turned on during the first sensing period.

19. The touch display device of claim 13, wherein a total number of channel switches included in the plurality of channel switches is an odd number, and one of the plurality of channel switches is turned on during the first sensing period without another channel switch from the plurality of channel switches being simultaneously being turned on.

20. A touch driving circuit comprising:
a multiplexer comprising N channel switches, each of the N channel switches electrically connected to a corresponding one of N touch electrodes among a plurality of touch electrodes, wherein N is an integer greater than or equal to 2; and
a sensing unit electrically connected to the multiplexer, wherein:
two or more channel switches among the N channel switches are simultaneously turned on and short-circuited to each other during at least a partial period of a first sensing period; and
each of the two or more channel switches is sequentially turned on during a separate period in at least a partial period of a second sensing period that is after the first sensing period.

* * * * *